United States Patent [19]

Golba, Jr. et al.

[11] Patent Number: 4,831,115

[45] Date of Patent: May 16, 1989

[54] METHOD FOR REMOVING VOLATILE IMPURITIES FROM POLYPHENYLENE ETHERS

[75] Inventors: Joseph C. Golba, Jr., Ballston Spa; Sterling B. Brown, Schenectady; Alexandros Hasson, Delmar, all of N.Y.

[73] Assignee: General Electric Company, Schenectady, N.Y.

[21] Appl. No.: 156,046

[22] Filed: Feb. 16, 1988

[51] Int. Cl.$^4$ ............................................. C08G 65/46
[52] U.S. Cl. .................................. 528/481; 525/390; 525/397; 528/196; 528/212; 528/499; 528/500; 528/503

[58] Field of Search ............... 528/481, 499, 500, 212, 528/196, 503; 525/397, 390

[56] References Cited

U.S. PATENT DOCUMENTS 4,369,278  1/1983  Kasahara et al. .................. 524/147

*Primary Examiner*—Harold D. Anderson
*Attorney, Agent, or Firm*—William H. Pittman; James C. Davis, Jr.

[57] ABSTRACT

Polymer compositions comprising polyphenylene ethers free from polystyrenes are extruded with vacuum venting at 300° C. or above in the presence of water. This extrusion operation reduces the content of volatile impurities, including those with an undesirable odor.

14 Claims, No Drawings

METHOD FOR REMOVING VOLATILE IMPURITIES FROM POLYPHENYLENE ETHERS

This invention relates to the purification of polyphenylene ethers, and more particularly to the removal of volatile impurities therefrom.

Polyphenylene ethers (also known as polyphenylene oxides) are a class of polymers widely used in industry, especially as engineering plastics in applications requiring toughness and heat resistance. For many such applications, the polyphenylene ethers are blended with polystyrenes of various kinds in order to improve their processability. However, there has been increasing interest in recent years in employing polyphenylene ethers in the absence of polystyrenes, particularly in areas such as food packaging where the presence of polystyrenes is undesirable.

In many such new applications, particularly those involving contact with food, it is essential that the polyphenylene ether be free from materials which are volatile, have undesirable odors or would otherwise harm the food. Various materials of this kind may be present in polyphenylene ethers. They include dialkylamines such as di-n-butylamine, which are components of the catalyst used for the preparation of polyphenylene ethers as described hereinafter. Also present may be by-products formed in the synthesis of the substituted phenols from which the polyphenylene ethers are prepared. In the case of poly(2,6-dimetyl-1,4-phenylene ethers), these frequently include 2,4,6-trimethylanisole, 2,3-dihydrobenzofuran and 7-metyl-2,3-dihydrobenzofuran. Removal of 3,4,6-trimethylanisole is particularly crucial because of its pronounced odor.

U.S. Pat. No. 4,369,278 describes a method for removing volatile by-products from blends of polyphenylene ethers and rubber-modified polystyrenes. This method includes a step of extruding the blend at temperatures up to 300° C., with vacuum venting and preferably with the addition of a minor proportion of water. The method is specifically described as being inapplicable to pure polyphenylene ethers, since their treatment would involve temperatures above 300° C. Moreover, the volatile materials which are removed according to the reference are exclusively those formed in the preparation of the polystyrene component.

By the present invention, a method is provided for reducing the impurity content of compositions consisting essentially of polyphenylene ethers. Said method is effective to reduce the content of volatile impurities, including those with an undesirable odor, to the extent that the product may be employed in such critical end use areas as food packaging.

Accordingly, the invention is a method for removing impurities from a polymer composition consisting essentially of polyphenylene ether free from polystyrene, which comprises extruding said composition at a temperature in excess of 300° C. with vacuum venting, in the presence of an amount of water up to about 15% by weight of said composition.

The polyphenylene ethers to which the present invention is applicable comprises a plurality of structural units having the formula

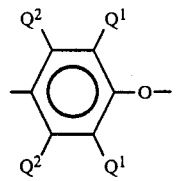

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The invention is particularly applicable to polyphenylene ethers which comprise molecules having at least one of the end groups of the formulas $$\text{(II)}$$

$$\text{and}$$

$$\text{(III)}$$

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substitued end groups may undergo various reactions, probably involving a quinone methide-type intermediate of the formula $$\text{(IV)}$$

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formual III are typically obtained from reaction mixtures in which a by-product diphenoquinone of the formula $$\text{(V)}$$

is present, especially in a copper-halide-secondary tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

The method of this invention may also be employed with functionalized polyphenylene ethers. These may be prepared by the reaction of at least one functionalizing agent with a polyphenylene ether. The functionality of the functionalized polyphenylene ether may be present on the end group; for example, as a result of reaction with the phenolic terminal hydroxy group. The hydroxy group in an end group having formula III is preferred because of its relative thermal stability. Functionalization may also involve one of the aromatic rings in the polymer chain, or an alkyl group attached thereto.

One method of functionalizing the polyphenylene ether is by reaction with at least one compound containing (a) a carbon-carbon double or triple bond, hydroxy group, alkoxy group, aryloxy group or acyl halide group, and also (b) a carboxylic acid, acid salt, acid anhydride, acid amide, acid ester or imido group. A wide variety of such compounds are suitable for use in the invention. Many illustrative compounds are listed in U.S. Pat. No. 4,315,086 and in copending, commonly owned application Ser. No. 885,497, filed July 14, 1986, the disclosures of which are incorporated by reference herein. They include maleic, fumaric, itaconic and citraconic acids and their derivatives, various unsaturated fatty oils and the acids derived therefrom, relatively low molecular weight olefinic acids such as acrylic acid and its homologs, and the like.

Other functionalizing agents and the aliphatic polycarboxylic acids and derivatives thereof disclosed in copending, commonly owned application Ser. No. 736,489, filed May 20, 1985. Illustrative polycarboxylic acids of this type are citric acid, malic acid and agaricic acid. Their ester, amides and salts may also be used.

Still another class of functionalizing agents is disclosed in U.S. Pat. No. 4,600,741, the disclosure of which is also incorporated by reference herein. Illustrative compounds within this class are carboxymethylsuccinic anhydride acid chloride and trimellitic anhydride acid chloride (TAAC).

The functionalized polyphenylene ether may be prepared in solution or in the melt. It is frequently advantageous to prepare it in situ, in the same operation in which the method of this invention is conducted. This is particularly true when the functionalizing agent is an olefinic compound such as maleic anhydride or fumaric acid.

The polymer compositions to which the present invention is applicable are those which consist essentially of the above-described polyphenylene ethers; that is, those in which said polyphenylene ether is the only material contributing to the novel and useful properties of the composition. In particular, blends of polyphenylene ethers with polystyrenes of any kind are not contemplted. At the high temperatures employed in this invention, there is potential for degradation of polystyrenes with the formation of volatile products.

An essential step in the method of this invention is extrusion of the polyphenylene ether. Extrusion may be conducted using any known equipment for this operation, including single-screw and twin-screw extruders. Since vacuum venting during extrusion is another essential feature, the presence of at least one suitable vent is mandatory. The degree of vacuum will depend on several factors, including the proportion of volatile impurities in the polyphenylene ether end and the amount of water employed as described hereinafter. In general, a pressure in the range of about 550–740 torr is acceptable.

The temperature of the extrusion operation is also critical to achieve the desired devolatilization. Said temperature must be in excess of 300° C., and is preferably at least 310° C. In most cases, temperatures from 310° to about 325° C. are suitable.

Another essential feature is the introduction of water during the extrusion operation. Said water may be in the form of liquid water, steam or superheated steam, with steam often being preferred for maximum energy efficiency. The water may be introduced at any convenient point upstream of the vent. It is highly preferred, however, to introduce it through a port located at a point in the extruder where the polymer composition has been converted into a fully developed melt, since this facilitates intimate contact with the polymer.

As previously indicated, the proportion of water employed is up to about 15% by weight of the polymer composition. The preferred proportion is about 0.5–5.0%, since an amount within this range is generally optimally effective for removal of volatiles without overburdening the vacuum system.

In most instances, maximum or near-maximum rate of rotation of the extruder screw or screws should be maintained for effective devolatilization. The rotation rate will to some extend be dependent on the equipment used, but values in the range of about 350–500 rpm. are generally sufficient.

The method of this invention is illustrated by the following examples. The polyphenylene ether employed in these examples was a poly(2,6-dimethyl-1,4-phenylene ether) having a number average molecular weight, as determined by gel permeation chromatography, of about 20,000.

EXAMPLE 1

Polyphenylene ether was extruded through a vacuum-vented 30-mm. extruder at a rate of about 16 kg. per hour, a screw speed of 500 rpm. and a temperature of 316° C. Liquid water was injected between the extruder feed and the vent at the rate of 5% based on resin introduction rate, and a pressure of 635 torr was maintained. A control sample was extruded in the same way except that water was not introduced.

The product and control were analyzed for nitrogen by Kjeldahl analysis for volatiles, including 2,4,6-trimethylanisole, by gas chromatography-mass spectrometry. The proportions of nitrogen and volatiles of the product prepared by the method of this invention were 398 and 9 ppm., respectively, as compared with 496 and 66 ppm., respectively, for the control.

EXAMPLE 2

A mixture of 100 parts of polyphenylene ether and 0.7 part of fumaric acid was extruded as described in Example 1, except that the feed rate was 14 kg. per hour, the screw speed was 350 rpm. and the pressure was 584 torr. The product contained 498 ppm. of nitrogen, compared to 624 ppm. for the control.

EXAMPLE 3

The procedure of Example 1 was repeated, using various feed rates of polyphenylene ether and water. The results are given in the following table.

| Polymer feed rate, kg./hr. | Water feed rate, % of polymer | Volatiles, ppm. |
| --- | --- | --- |
| 13.6 | 0 | 37 |
| 13.6 | 7 | 14 |
| 11.3 | 4 | 13 |
| 11.3 | 14 | 9 |

What is claimed is:

1. A method for removing impurities from a polymer composition consisting essentially of polyphenylene ether free from polystyrene, which comprises extruding said composition at a temperature in excess of 300° C. with vacuum venting, in the presence of an amount of water up to about 15% by weight of said composition.

2. A method according to claim 1 wherein the polyphenylene ether is a poly(2,6-dimethyl-1,4-phenylene ether).

3. A method according to claim 2 wherein the pressure during extrusion is in the range of about 550–720 torr.

4. A method according to claim 3 wherein the proportion of water is about 0.5–5.0% by weight of the polymer composition.

5. A method according to claim 4 wherein the water is introduced as liquid water.

6. A method according to claim 4 wherein the water is introduced as steam.

7. A method according to claim 2 wherein the polyphenylene ether is a functionalized polyphenylene ether.

8. A method according to claim 7 wherein the pressure during extrusion is in the range of about 550–720 torr.

9. A method according to claim 8 wherein the polyphenylene either is functionalized by reaction with maleic anhydride or fumaric acid.

10. A method according to claim 9 wherein the functionalized polyphenylene ether is prepared in situ.

11. A method according to claim 10 wherein the proportion of water is about 0.5–5.0% by weight of the polymer composition.

12. A method according to claim 11 wherein the water is introduced as liquid water.

13. A method according to claim 11 wherein the water is introduced as steam.

14. A method according to claim 11 wherein the water is introduced as superheated steam.

* * * * *